March 25, 1958  J R. ESTEY  2,827,736
LATH HOUSE CONSTRUCTION
Filed Dec. 5, 1952  4 Sheets-Sheet 2

INVENTOR.
JAMES ROYDEN ESTEY
BY HIS ATTORNEYS.
HARRIS, KIECH, FOSTER & HARRIS
By

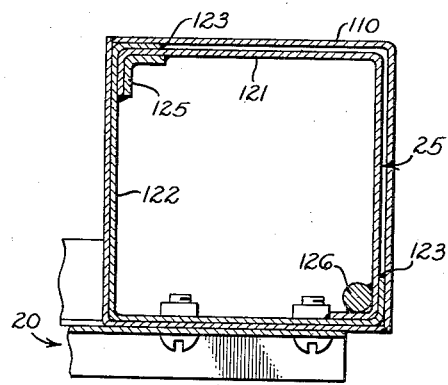
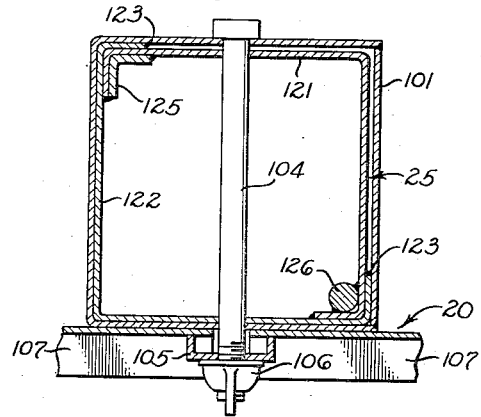
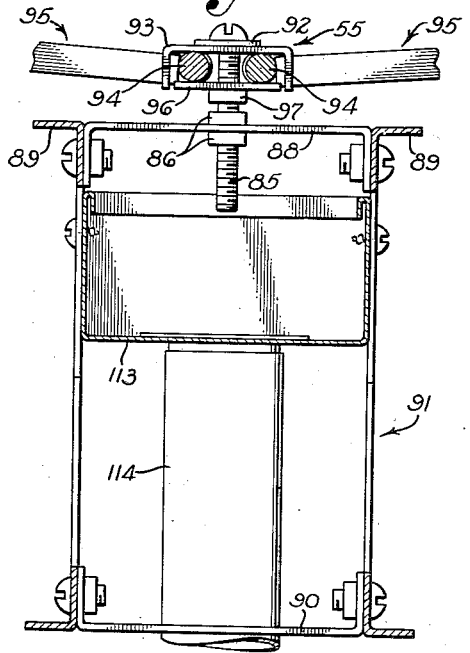
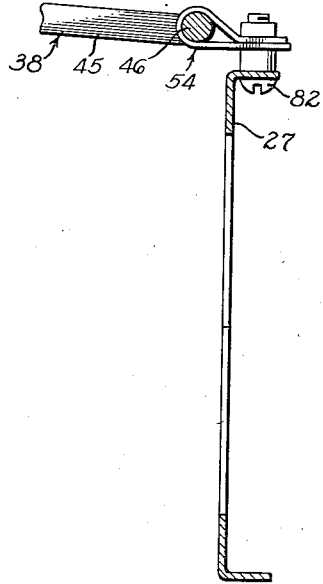
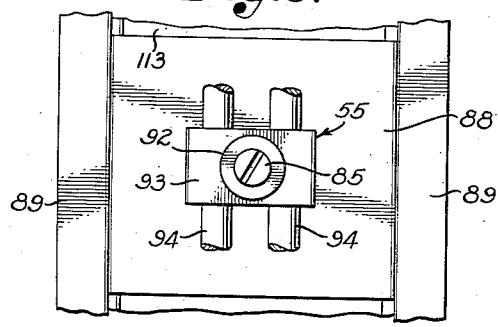
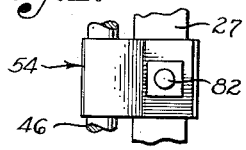
INVENTOR.
JAMES ROYDEN ESTEY
BY HIS ATTORNEYS.
HARRIS, KIECH, FOSTER & HARRIS

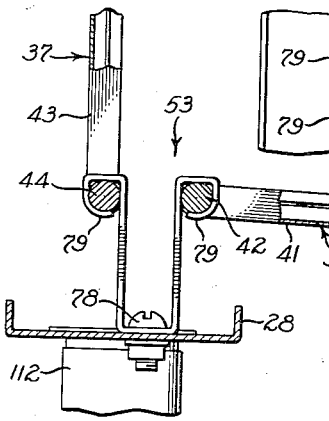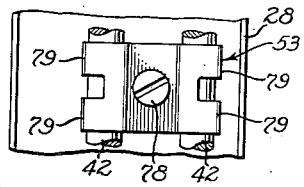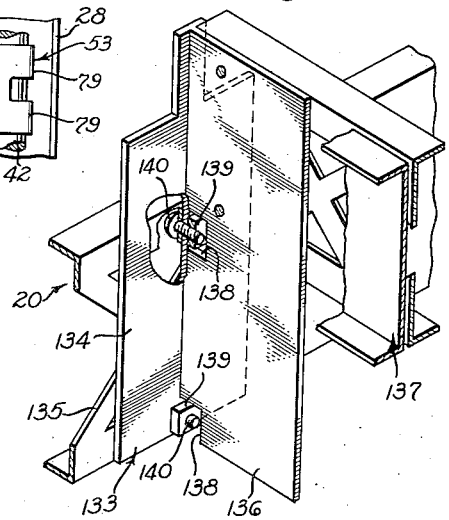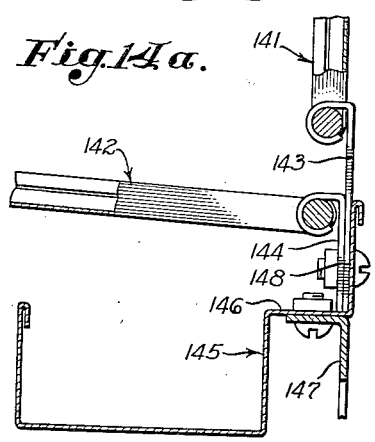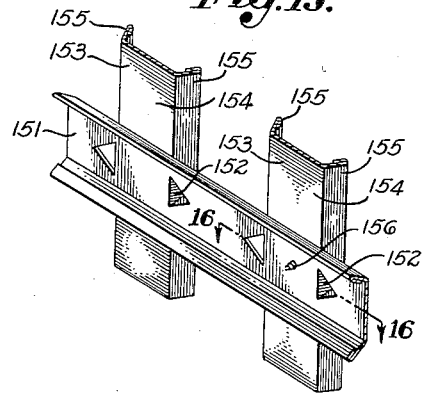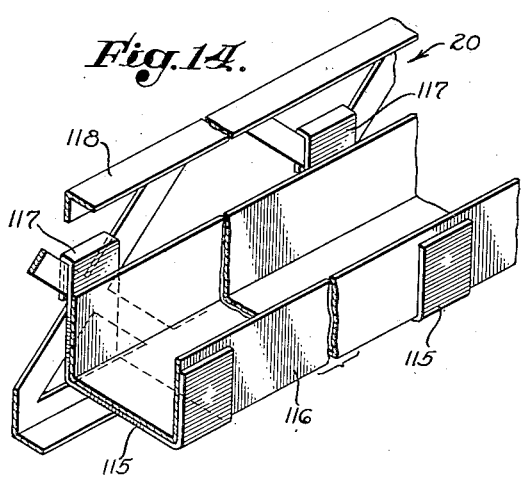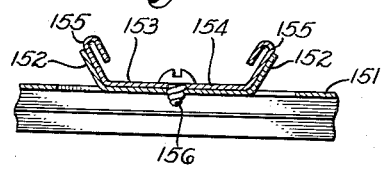

United States Patent Office 2,827,736
Patented Mar. 25, 1958

2,827,736

LATH HOUSE CONSTRUCTION

James Royden Estey, South Pasadena, Calif., assignor to Aluminex Incorporated, Los Angeles, Calif., a corporation of California Application December 5, 1952, Serial No. 324,264

3 Claims. (Cl. 47—28)

The present invention relates to lath houses and, more particularly, to a lath house having a frame which carries a roof and walls formed of laths, the various components of the frame and the laths preferably being metallic. For example, various aluminum alloys may be employed, particularly for the laths, to provide a sturdy but lightweight structure. The laths are preferably channel-shaped in cross section and the laths preferably face outwardly so that the roof laths intercept and convey to the sides of the structure at least a portion of the rainfall incident on the roof. Lath houses of this character which embody various features of the lath house disclosed herein are disclosed and claimed in my applications Serials Nos. 9,822, filed February 20, 1948 (now abandoned); Serial No. 112,623, filed August 26, 1949, now Patent No. 2,676,433; Serial No. 319,976, filed November 12, 1952, now Patent No. 2,735,224; and Serial No. 398,828, filed December 17, 1953.

A primary object of the invention is to provide a lath house wherein the walls and roof comprise lath panels removably mounted on the frame. With this construction, the lath panels may be fabricated independently of the frame and may be mounted on the frame as units to facilitate erection of the structure. Also, the lath panels may be removed readily whenever desired.

More particularly, an important object of the invention is to provide such a lath house wherein each lath panel comprises two spaced rods and a plurality of laths extending between and connected at their ends to the rods, preferably by looping the ends of the laths around the rods as disclosed in the aforementioned copending applications. A related object is to provide releasable means on the frame and engageable with the rods of each lath panel for releasably securing the lath panel to the frame.

Related objects are to provide various fastening devices by means of which the lath panels may be secured to the frame readily in a releasable manner. One such fastening device comprises a hook adapted to be hooked over one of the rods of a lath panel and to be connected to the frame, such hook having means for camming the associated rod into a slot or other receptacle as the hook is moved into position to be attached to the frame. Another such fastening device includes one or more tabs adapted to be bent or crimped around a rod of one of the lath panels to secure same to the frame.

A further object is to provide gutter means forming part of the frame for collecting rainfall discharged by the roof laths and for conveying such rainfall to suitable points of discharge. More particularly, an object in this connection is to provide a frame which includes beams in the form of upwardly facing channels located adjacent the ends of the roof laths to receive rainfall discharged therefrom, such beams thus serving both as structural members and as gutters, which is an important feature.

Another object is to provide gutter supporting clips which may be hooked onto the frame readily at any desired points so that separate gutters may be mounted on the frame as desired with a minimum of effort.

Another important object of the invention is to provide spacing means for the laths of each lath panel comprising one or more spacing strips each having pairs of laterally projecting tabs formed integrally therewith, the tabs of each pair being adapted to receive therebetween one of the laths to space same accurately from adjacent laths.

Another object is to provide a frame which includes columns set in base sleeves carried by a foundation and which includes upper sleeevs fitted over the columns and carrying horizontal beams, such a construction greatly facilitating erection of the structure. In this connection, an object is to provide a base sleeve having a wall portion thereof bent inwardly to close the sleeve, such closure limiting upward movement of concrete into the interior of the base sleeve when it is set in concrete. With this construction, the lower end of a column set in each base sleeve is positioned at the proper elevation, which is an important feature.

Another object is to provide columns each made from two channel-shaped beams bent into angle members along their longitudinal axes in such a manner that the flanges of the channel members face each other. The two bent channel members are then nested together in such a manner as to form a column of square cross section. With this column construction, the same basic beams may be used both as horizontal components of the frame and as vertical components thereof, thereby reducing the number of types of components required, which is an important feature.

A related object is to provide box beams made of two basic beams connected together by stirrup members, thereby further reducing the number of types of components required for the frame.

Another object is to provide fittings for connecting the frame members together comprising members of T-shaped cross section having legs insertable between two back-to-back channel members and attachable to other components of the frame.

The foregoing objects and advantages of the present invention, together with various other objects and advantages thereof which will become apparent, may be attained with the exemplary embodiments of the invention illustrated in the accompanying drawings and described in detail hereinafter.

Referring to the drawings:

Fig. 4 is a fragmentary sectional view of another embodiment of a releasable means for securing a lath panel to the frame;

Fig. 5 is a top plan view of the structure shown in Fig. 4;

Fig. 6 is a fragmentary sectional view of another releasable means for securing a lath panel to the frame;

Fig. 7 is a top plan view of the structure shown in Fig. 6;

Fig. 8 is a fragmentary sectional view of another releasable means for securing lath panels to the frame;

Fig. 9 is a top plan view of the structure shown in Fig. 8;

Figure 2:
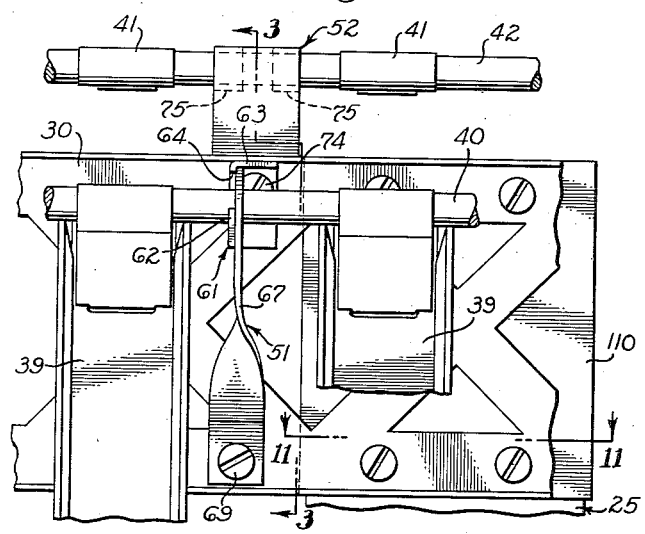
Fig. 2 is a fragmentary elevational view showing one embodiment of a releasable means for securing a lath panel to a frame of the lath house.
Figure 10:
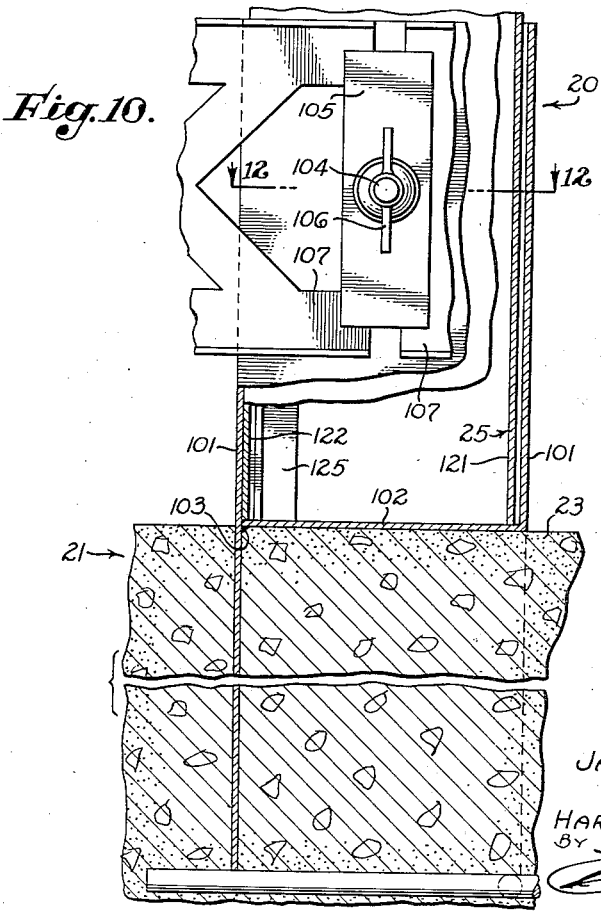
Fig. 10 is a sectional view of a base sleeve embedded in a concrete foundation and having a column inserted thereinto.

Figs. 11 and 12 are sectional views respectively taken along the arrowed lines 11—11 and 12—12 of Figs. 2 and 10, respectively;

Fig. 13 is a fragmentary isometric view showing a fitting connecting members of the frame;

Fig. 14 is a fragmentary isometric view showing means for mounting a gutter on the frame;

Fig. 14a is a fragmentary sectional view on a reduced scale showing another releasable panel-securing means and gutter construction;

Fig. 15 is a fragmentary isometric view showing a lath spacing means of the invention;

Fig. 16 is a sectional view taken along the arrowed line 16—16 of Fig. 15; and

Figure 17:
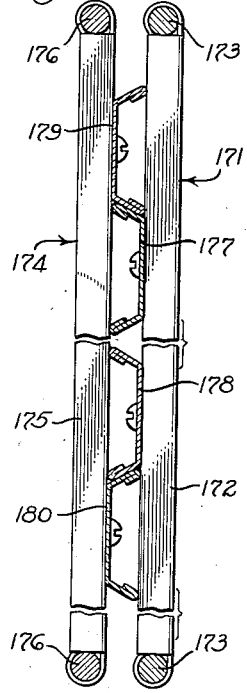

Fig. 17 is a fragmentary sectional view of a double wall panel construction having one panel movable relative to the other to vary the shading of the interior of the building.

Figure 1:
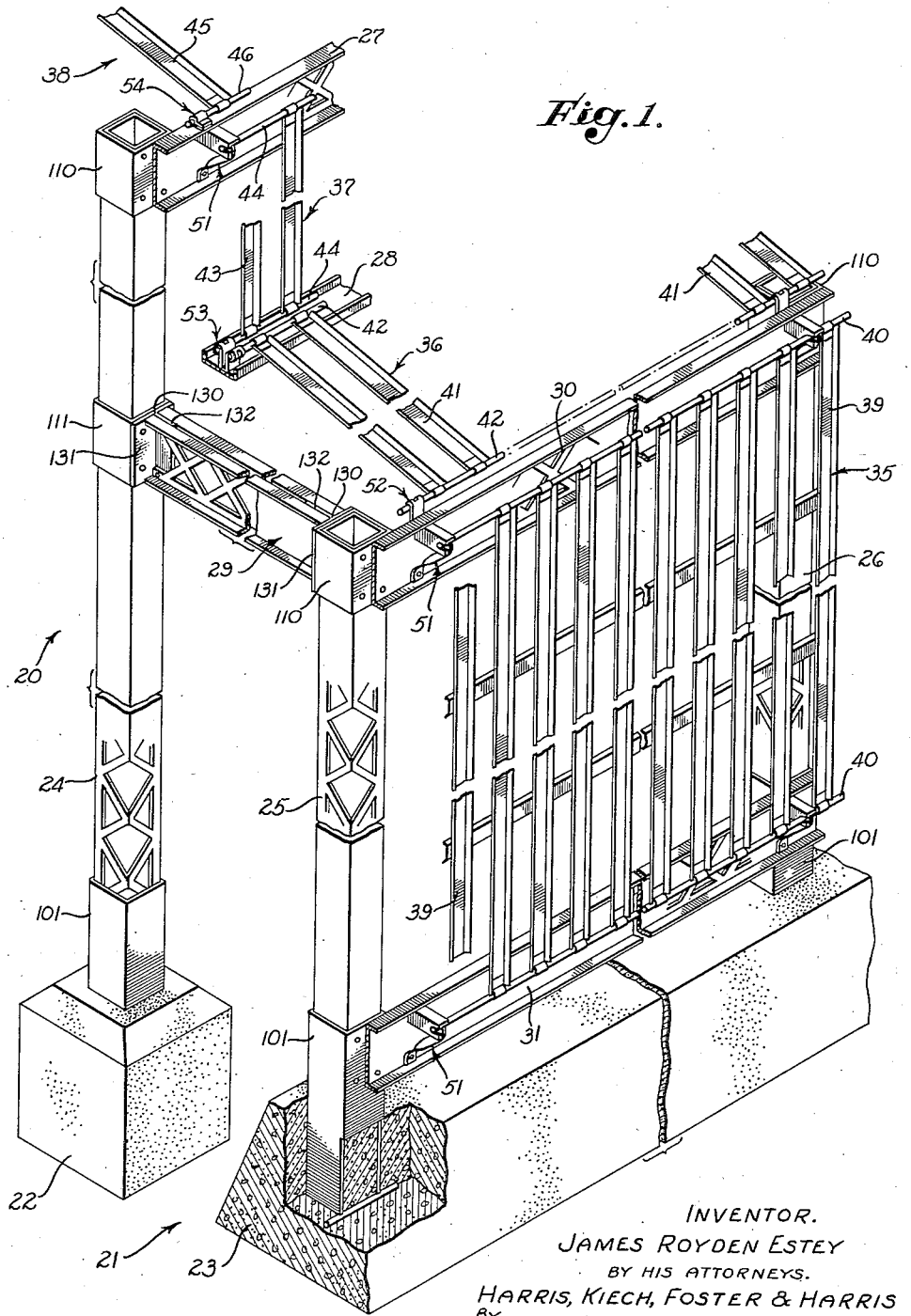
Fig. 1 is a fragmentary isometric view of a lath house which embodies the invention.

Referring particularly to Fig. 1, which is merely illustrative of one of various structures in which the invention may be embodied, the structure shown therein includes a frame 20 on a foundation 21, the latter including a pier 22 and a sill 23. The frame 20 is shown as including columns 24, 25 and 26 and beams 27, 28, 29, 30 and 31, the manner in which the columns are connected to the foundation 21 and the manner in which the beams are connected to the columns being considered in more detail hereinafter.

The structure of Fig. 1 is shown as including a plurality of lath panels 35, 36, 37 and 38 which are carried by the frame 20 and which form the walls and roof of the lath house structure. An important feature of the present invention is that these lath panels are releasably secured to the frame 20 so that they may be installed and/or removed readily as units. Another advantage of this construction is that the lath panels may be made up independently of the rest of the structure and may then be mounted on the frame 20 as units to facilitate erection of the lath house. Also, the wall panels may be swung upwardly about their upper edges to provide additional shaded areas.

Considering the lath panels 35, 36, 37 and 38 in more detail, each includes a pair of spaced rods and a plurality of spaced, parallel laths extending between and connected at their ends to the rods. The laths and rods of the lath panel 35 are indicated by the numerals 39 and 40, respectively, the laths and rods of the lath panel 36 are identified by the numerals 41 and 42, respectively, the laths and rods of the lath panel 37 are identified by numerals 43 and 44, respectively, and the laths and rods of the lath panel 38 are identified by the numerals 45 and 46, respectively. The various laths are preferably connected to the corresponding rods by looping the ends of the laths around the rods, as more fully disclosed in the aforementioned copending applications. Also, the various laths are preferably channel-shaped in cross section and face outwardly relative to the interior of the lath house structure, whereby any rainfall incident on the laths of the roof panels, i. e., the panels 36 and 38, is collected and discharged from the ends of such laths to reduce the amount of rainfall entering the interior of the lath house structure. The rainfall collected by and discharged from the ends of the roof laths 41 and 45 may be collected by gutters, as hereinafter discussed in detail.

Considering the releasable connections of the lath panels 35, 36, 37 and 38 to the frame 20 in more detail, several embodiments of releasable fastening devices are illustrated, these being identified by the numerals 51, 52, 53, 54 and 55. These fastening devices will now be considered in numerical order.

Figure 3:
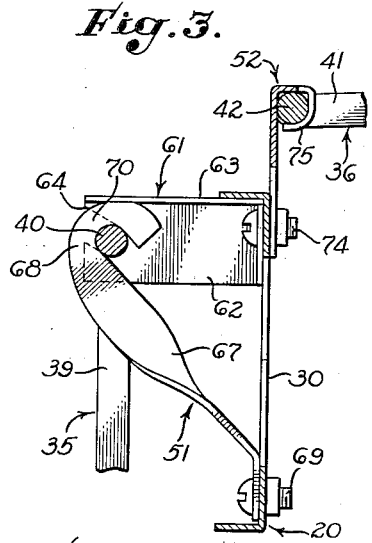
Fig. 3 is a fragmentary sectional view taken along the arrowed line 3—3 of Fig. 2.

Referring particularly to Figs. 2 and 3 of the drawings, illustrated therein is one of the fastening devices 51 in use for connecting the lath panel 35 to the beam 30. The fastening device 51 illustrated in Figs. 2 and 3 is identical to all of the other fastening devices 51 and includes an angle member 61 bolted or otherwise secured at one end to the beam 30, as best shown in Fig. 3. The angle member 61 has a vertical leg or flange 62 and a horizontal leg or flange 63, the vertical leg 62 having therein a receptacle or slot 64 which extends inwardly from one end of the angle member in a direction away from the leg 63, the slot 64 being inclined downwardly when the angle member 61 is mounted as shown. The slot 64 is adapted to receive one of the rods 40 of the lath panel 35 therein. The fastening device 51 also includes a substantially J-shaped hook member 67 having at one end a hook portion 68 adapted to be hooked over the rod 40 and to be disposed between the rod and the leg 63 of the angle member 61. The opposite end of the hook member 67 is adapted to be connected to the beam 30, as by a bolt 69. The hook portion 68 is provided with a portion 70 of minimum width which fits relatively loosely between the rod 40 and the leg 63 when the hook member 67 is oriented substantially vertically. The width of the hook portion 68 increases from the minimum-width portion 70 toward the free end of the hook portion so that, as the hook member 67 is rotated from a substantially vertical orientation to the orientation shown in Fig. 3, the hook portion 68 cams the rod 40 firmly into the slot 64. Thus, after the hook member 67 has been fastened to the beam 30, as by the bolt 69, the rod 40 is firmly anchored in place, which is an important feature.

As will be apparent, in order to connect the rod 40 of the lath panel 35 to the beam 30, it is merely necessary to insert the rod into the downwardly inclined slot 64, the angle member 61 thus automatically supporting the lath panel 35. Subsequently, the hook member 67 is rotated into the position shown in Fig. 3 of the drawings, thereby positively camming the rod 40 into the inner end of the slot 64 to rigidly lock the rod in place.

The fastening device 52 is also shown in Fig. 2 and 3 of the drawings and comprises a clip adapted to be secured to the frame 20, e. g., the beam 30, as by a bolt 74. The fastening device or clip 52 is slotted at its free end to provide tabs 75 adapted to be bent around a rod of one of the lath panels, e. g., a rod 42 of the lath panel 36. The rod 42 may be disengaged from the fastening device 52 readily merely by straightening the tabs 75.

The fastening device 53 is illustrated best in Figs. 8 and 9 of the drawings and comprises a U-shaped clip adapted to be connected to the frame, e. g., the beam 28, as by a bolt 78. Each arm of the U-shaped clip or fastening device 53 terminates in tabs 79 adapted to be bent around rods of adjoining lath panels. In the particular construction illustrated, the tabs 79 on one arm of the clip 53 are connected to a rod 42 of the lath panel 36 and the tabs 79 of the other arm are connected to a rod 44 of the lath panel 37.

The fastening device 54 is best shown in Figs. 6 and 7 of the drawings and comprises a band or strap bent around one of the rods of one of the lath panels and having its ends connected to the frame, as by a bolt 82. In the particular construction illustrated, the fastening device 54 secures one of the rods 46 of the lath panel 38 to the beam 27.

Referring to Figs. 4 and 5 of the drawings, the fastening device 55 includes a threaded member or bolt 85 secured to the frame 20 by nuts 86. In the particular construction shown, the nuts 86 are disposed on opposite sides of a stirrup 88 which extends between channel-shaped beams 89, these beams also being connected by a stirrup 90. The combination of beams 89 and stirrups 88 and 90 forms a box beam 91, the beams 89 being basic structural components which, as discussed in more detail hereinafter, are used throughout the frame 20 either individually or in various combinations to provide a variety of frame components, such as beams and columns. This feature greatly reduces the number of types of basic components required for the frame, which is important. Continuing to consider the fastening device 55, seated against a washer 92 under the head of the bolt 85 is a U-shaped clip 93 which receives therein two rods 94 of adjacent lath panels 95, each rod being disposed between the bolt 85 and one arm of the clip 93. The rods 94 are held in the U-shaped clip 93 by a closure member 96 which may take the form of a washer or plate. The closure member 96 is movable along the bolt 85 by a threaded member, such as a nut 97, thereon. Thus, to secure the rods 94 in place it is merely necessary to insert them into the U-shaped clip 93 and then to advance the closure member 96 into clamping engagement therewith by means of the nut 97, thereby providing means for readily connecting and disconnecting the panels 95 to the frame. The fastening device 55 also permits vertical adjustments of the panels 95 relative to the frame. For example, if it is later desired to place additional roof panels, not shown, under the panels 95 to provide a double roof, the panels 95 can be raised readily for this purpose.

Turning now to a more detailed consideration of the structure of the frame 20, each of the columns 24, 25 and 26 is set into a base sleeve 101 which is set in the concrete of the foundation 21. As best shown in Fig. 10, a portion 102 of each base sleeve 101 is bent inwardly to serve as a closure or partition intermediate the ends of the base sleeve, such portion preferably being welded, or otherwise secured in place, as indicated at 103. With this construction, when the concrete for the foundation 21 is poured, the sleeve portion 102 limits the upward movement of the concrete in the sleeve, even though the concrete is poured to a higher level than the sleeve portion 102. Consequently, when the columns are subsequently inserted into the base sleeves, the lower ends thereof are all at the desired elevations, which is an important feature. If desired, the columns may be bolted or otherwise secured to the base sleeves, although this is not essential. Continuing to refer to Fig. 10 of the drawings, if desired, each base sleeve 101 may carry a bolt 104 on which is pivoted a clamp bar 105, the bolt having threaded thereon a wing nut 106 adapted to bear against the clamp bar 105. With this construction, the clamp bar 105 may be employed to secure elements 107 of two adjacent lath panels in place, thereby providing an additional releasable fastening means for the lath panels and the bottom beams.

The upper ends of the columns 24, 25 and 26 are provided with top sleeves 110 which are telescoped over the columns and which are bolted or otherwise secured thereto, the beams connected to such columns being bolted or otherwise secured to the top sleeves. The column 24 is shown as provided with an intermediate sleeve 111 telescoped thereover and bolted or otherwise secured thereto, the beams 28 and 29 being connected to such intermediate sleeve.

One feature of the invention is that the beam 28, which is a solid, upwardly facing channel, serves as a gutter adapted to collect the rainfall discharged by the laths 45 of the roof lath panel 38, and also any rainfall discharged by the laths 43 of the wall lath panel 37. As best shown in Fig. 8, one or more downspouts 112 may be connected to the beam 28 to convey the water collected thereby to suitable points of disposal. Thus, the beam 28 serves the dual function of a gutter and a structural frame member, which is an important feature.

In Fig. 4, a gutter 113 to receive water from the panels 95 is placed in the box beam 91, a downspout 114 being connected to the gutter.

An alternative gutter construction is illustrated in Fig. 14 of the drawings. Referring thereto, all of the beams and columns of the frame 20, excepting those used as gutters, are preferably of open construction to minimize weight, the webs of the various beams being shown as being lattice-like in nature. As shown in Fig. 14, U-shaped gutter clips 115 support a gutter 116 which is seated therein, the gutter clips having hooks or hook portions 117 which are hooked over the lattice-like web of a beam 118, the latter being typical of the beams employed throughout the frame.

In Fig. 14a, lath panels 141 and 142 are releasably secured by clips 143 and 144 similar to the clip 52 discussed previously. A combination gutter and beam member 145 has a flange 146 which rests on and is secured to a channel 147, and has a flange 148 to which the clips 143 and 144 are secured. As will be apparent, both panels 141 and 142 will drain into the member 145, water from the panel 142 spilling against the flange 148 and thence draining into the gutter portion of the member 145. Such gutter portion is offset downwardly so that in the event it is later desired to add a panel, not shown, below the panel 142 to provide a double roof, this can be done readily.

Referring to Figs. 11 and 12, each of the columns of the frame 20 is made of two channel-shaped beams each of which is similar to the beams 27, 29, 30, 89, 118, and the like. In Figs. 11 and 12, the column 25 is shown for purposes of illustration and the two channel-shaped beams referred to are identified by the numerals 121 and 122. Each of the beams 121 and 122 has been bent into what is, in effect, an angle section by bending it along the longitudinal axis of its web, the direction of bending being such that the legs or flanges of the original channel-shaped beam face inwardly. The two beams, after bending are nested together in the manner shown in Figs. 11 and 12 to provide a column 25 of square cross section, the two bent beams being welded, or otherwise secured together, as indicated by the numeral 123. If desired, reinforcing members, such as an angle 125, or a rod 126, may be placed in the corners of the resulting column and welded in place to provide additional strength.

It will be apparent that a minimum number of types of structural members is required for the frame 20 by employing a single basic beam throughout the structure, both by horizontal beams and as vertical columns. For example, referring to Fig. 1 of the drawings, the beam 27 both components of the double beam 29, the beam 30, the beam 31, and the halves of each of the columns 24, 25 and 26 may all be identical structural members so that a minimum of types of components is required, which is an important feature.

Referring to Fig. 1 of the drawings, the double beam 29 may be connected to the intermediate sleeve 111 on the column 24 and the top sleeve 110 on the column 25 by means of T-fittings 130. Each T-fitting has a base 131 bolted or otherwise secured to the corresponding sleeve, and has a leg 132 inserted between and bolted or otherwise secured to the components of the beam 29. Another embodiment of a T-fitting of the invention is illustrated in Fig. 13 of the drawings and is identified by the numeral 133. This T-fitting has a base 134 connected to a beam 135 and has a leg 136 inserted between and bolted or otherwise connected to the elements of a double beam 137, the beam 135 and the elements of the double beam 137 again preferably being identical or similar to the basic beam hereinbefore discussed. A feature of the T-fitting 133 is that the leg 136 thereof is provided with openings 138 therein adjacent the junction of the leg 136 with the base 134. These openings receive nuts 139 on bolts 140 which extend through the beam 135 and the base 134 of the T-fitting. The edges of the openings 138 prevent rotation of the nuts 139 as the bolts 140 are threaded thereinto, thereby further facilitating erection of the frame.

Referring to Figs. 15 and 16 of the drawings, illustrated therein is a spacing means of the invention for spacing the laths of any of the lath panels hereinbefore mentioned. This spacing means is shown as including a spacing strip 151 having thereon pairs of laterally extending tabs 152, each pair of tabs being adapted to receive therebetween a lath 153 and to space it from an adjacent lath. As hereinbefore discussed, the laths 153 are preferably channel-shaped in cross section and have base portions 154 and side portions or legs 155, the sides making angles of greater than 90° with the bases. To accommodate the laths 153, the tabs 152 of each pair similarly make angles of greater than 90° with the strip 151. Preferably, the spacing strip 151 has the same cross section as the laths 153 to provide stiffness against lateral bending, the tabs 152 preferably being triangular and being punched out of the base portion of the spacing strip. In order to anchor the spacing strip 151 in position, it is preferably attached to the lath 153 at intervals, as by means of screws 156, it being necessary to use such screws for occasional laths only. Thus, the spacing strip 151 positively spaces the laths 153 and holds them in the desired spaced relation, which is an important feature.

Referring now to Fig. 17 of the drawings, illustrated therein is a double panel which includes a stationary wall panel 171 carried by a frame, not shown, and composed of spaced laths 172 having their ends looped around rods 173, and which includes a movable wall panel 174 composed of spaced laths 175 having their ends looped around rods 176, the panel 174 being movable in a direction perpendicular to the plane of Fig. 17 to move the laths 175 into or out of registry with the laths 172 so as to vary the amount of wind, rainfall and/or sunlight passing through the panels. The laths 172 are spaced apart by channel-shaped spacing strips 177 and 178 and the laths 175 are spaced apart by similar spacing strips 179 and 180. The strips 177 to 180 may be similar to the strips 151 described previously and may be secured to the corresponding laths in the same manner.

It will be noted that the strip 179 rests on the strip 177 so that the latter serves as a track for the movable panel 174. The strip 180 is disposed under and interlocked with the strip 178 to key the lower portion of the movable panel 174 to the stationary panel 171 while permitting sliding movement of the movable panel. Thus, the strips 177 to 180 serve dual functions, i. e., they serve as track and keying members, and also serve as spacing members, which is an important feature.

It will be understood that the strip 180 may also be located above and rest on the strip 178 so that the latter would serve as a track. In this event, the strip 179 would preferably be under and interlocked with the strip 177 to key the upper portion of the panel 174 to the panel 171.

Although I have disclosed various exemplary embodiments of my invention for purposes of illustration, it will be understood that various changes, substitutions and modifications may be incorporated in such embodiments without departing from the spirit of the invention.

I claim as my invention:

1. In a fastening device for attaching to a frame a lath panel which comprises two spaced rods and a plurality of laths extending between and connected at their ends to said rods, the combination of: an angle member connected to said frame, one leg of said angle member having an inclined slot therein to receive one of said rods; and a J-shaped hook connected at one end to said frame and having at its other end a cam portion inserted between said rod and the other leg of said angle member so as to cam said rod into said inclined slot.

2. In a fastening device for attaching to a frame a lath panel which comprises two spaced rods and a plurality of laths extending between and connected at their ends to said rods, the combination of: an angle member connected to said frame, one leg of said angle member having an inclined slot therein to receive one of said rods; a J-shaped hook having at one end a hook portion adapted to be inserted between said rod and the other leg of said angle member, said hook portion increasing in thickness toward the free end thereof so that, upon rotation of said J-shaped hook member about said rod, said hook portion cams said rod into said inclined slot; and means for fastening the other end of said J-shaped hook member to said frame.

3. In a lath house, the combination of: a frame; separate, independent lath panels each including a pair of spaced, parallel rods and each including a plurality of spaced, parallel laths, each of said laths of each of said lath panels extending between and being connected at its respective ends to the rods of such lath panel; and fastening means connecting said rods to said frame independently of each other, said fastening means comprising a plurality of fastening devices each of which includes an angle member connected to said frame, one leg of said angle member having an inclined slot therein to receive one of said rods, and each of which includes a J-shaped hook connected at one end to said frame and having at its other end a cam portion inserted between said rod and the other leg of said angle member so as to cam said rod into said inclined slot.

References Cited in the file of this patent

UNITED STATES PATENTS

| | | |
|---|---|---|
| 106,161 | Hoisington | Aug. 9, 1870 |
| 1,001,267 | Hetrick | Aug. 22, 1911 |
| 1,046,910 | Wagner | Dec. 10, 1912 |
| 1,258,914 | Kramer | Mar. 12, 1918 |
| 1,265,978 | Wade et al. | May 14, 1918 |
| 1,324,076 | Smith | Dec. 9, 1919 |
| 1,335,104 | Fouhy | Mar. 30, 1920 |
| 1,547,175 | Lally | July 28, 1925 |
| 1,596,776 | Stephenson | Aug. 17, 1926 |
| 1,639,916 | Wilson | Aug. 23, 1927 |
| 1,762,223 | Gross | June 10, 1930 |
| 1,942,713 | Klinka | Jan. 9, 1934 |
| 2,097,600 | Pavlecka | Nov. 2, 1937 |
| 2,184,113 | Calafati | Dec. 19, 1939 |
| 2,293,399 | Moecker et al. | Aug. 18, 1942 |
| 2,308,565 | Mitchell | Jan. 19, 1943 |
| 2,309,823 | Bowman | Feb. 2, 1943 |
| 2,382,075 | Leslie | Aug. 14, 1945 |
| 2,482,624 | Korman et al. | Sept. 20, 1949 |
| 2,596,056 | Tinnerman | May 6, 1952 |
| 2,625,353 | Henry | Jan. 13, 1953 |